Figure 1:
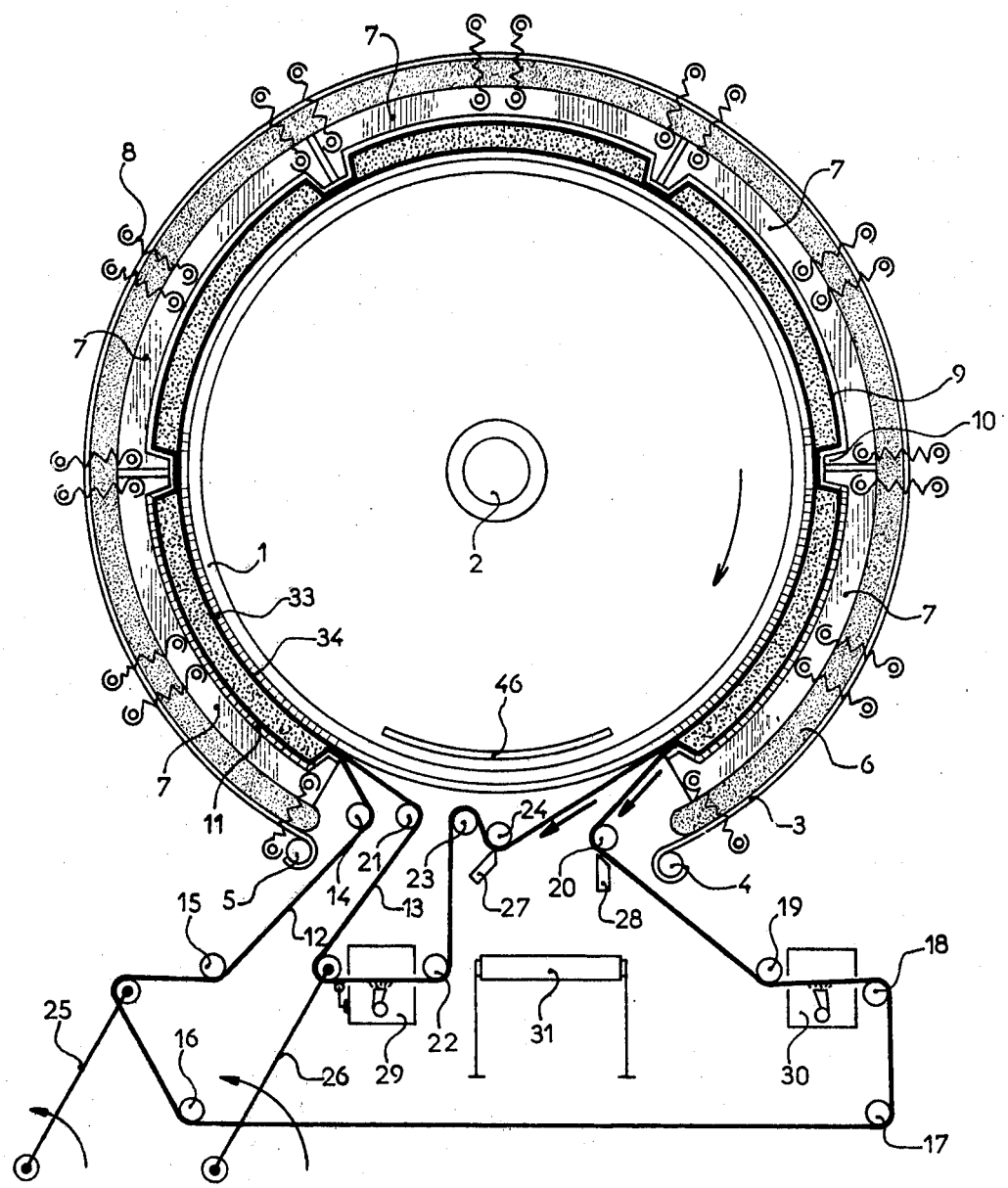

United States Patent [19]

Choquenet et al.

[11] 4,427,546

[45] Jan. 24, 1984

[54] FILTRATION DEVICES

[75] Inventors: Pierre Choquenet, Chauny; Jean C. Carle, Viry Noureil, both of France

[73] Assignee: Societe L. Choquenet (S.A.), Chauny, France

[21] Appl. No.: 386,120

[22] Filed: Jun. 7, 1982

[30] Foreign Application Priority Data

Jun. 4, 1981 [FR] France ................................. 81 11036

[51] Int. Cl.$^3$ ....................... B01D 33/04; B01D 33/38
[52] U.S. Cl. .................................... 210/351; 210/386; 210/396; 210/401; 210/405; 210/456
[58] Field of Search ......................... 100/112, 118–120, 100/151, 152, 188 R, 212; 210/350–352, 386, 396, 397, 401, 404, 405, 456

[56] References Cited

U.S. PATENT DOCUMENTS

| | | | |
|---|---|---|---|
| 3,743,100 | 7/1973 | Bahr ................................ | 100/118 X |
| 4,024,066 | 5/1977 | von Boehn et al. ............. | 210/404 X |
| 4,088,581 | 5/1978 | Carle ................................ | 210/401 X |
| 4,182,680 | 1/1980 | Carle ................................ | 210/386 |
| 4,266,474 | 5/1981 | Bahr ................................ | 210/401 X |
| 4,297,215 | 10/1981 | Altmeyer et al. ............... | 210/401 X |

FOREIGN PATENT DOCUMENTS

| | | | |
|---|---|---|---|
| 525016 | 12/1953 | Belgium ........................... | 100/118 |
| 574682 | 4/1959 | Canada ............................. | 210/396 |
| 73889 | 9/1960 | France ............................. | 100/118 |
| 2300604 | 7/1979 | France . | |
| 2426489 | 12/1979 | France . | |
| 2395058 | 3/1980 | France . | |

*Primary Examiner*—Robert H. Spitzer
*Attorney, Agent, or Firm*—Brisebois & Kruger

[57] ABSTRACT

The disclosure relates to the filtering of liquids charged with solid particles, with a filtration device of the kind comprising a rotary drum 1, a first continuous filter cloth 12 enflanking a first angular sector of the drum and separated from the drum in a second angular sector. A series of cellular elements 7 enflank the first sector and comprise a cell 9 whose bottom has grooves 11 in communication with a discharge orifice for clear liquid. Lateral injection means 35 for injecting a charged liquid which is to be filtered abreast of each cell. There is also a second continuous filter cloth 13 also enflanking the first sector and separated from the drum 1 in the said second angular sector. The outer surface of the drum has, abreast of each of the cells, a series of grooves 34 in communication with an orifice for recovery of clear liquid.

7 Claims, 5 Drawing Figures

FILTRATION DEVICES

The present invention relates to filtration devices of the kind comprising a rotary drum mounted on a stationary framework, a first filter cloth uninterruptedly enflanking a first angular sector of the drum and departing from this latter in a second angular sector, a series of cellular elements surrounding the said first sector and each comprising in alignment with the drum a cell delimited by a continuous rim and the bottom of which has grooves in communication with an orifice for discharge of the clear liquid, control means allowing of application of the said cellular elements on the drum in radial direction and of moving them away from the latter, lateral injection means of impelling a charged liquid intended to be filtered into the space delimited between the drum and the cellular elements when these are applied against the drum. Hereinafter, such a device will be referred to as "of the kind described".

A device of the kind described is already disclosed in Patent of Addition No. 2395058 to the French Pat. No. 7504343. This device has the disadvantage that the quantity of charge liquid processed in each filtration stage remains very small due to the small filtration surface formed by the filter cloth.

To remove or substantially eliminate this disadvantage, it has already been proposed to make use of a second filter cloth secured on the drum, which is provided with a fluted or ribbed mat for recovery of the clear liquid. An arrangement of this kind is described in the Patent of Addition No. 2426489 also to the French Pat. No. 7504343 and, in this case, the charged liquid is injected via radial tubes passing through the sheathing of the drum, the ribbed mat and the cloth secured on the drum. This assembly requires the fastening of the second cloth to the drum abreast of the injection pipes. Several drawbacks result therefrom; an eventual elongation of the cloth between its fastening points renders it difficult to scrape the cloth to eliminate the cake; the actual positioning of the cloth renders it impossible to wash and clear it, and finally the installation and disassembling of this cloth are protracted and difficult operations. Furthermore, it proved to be the case that it is practically impossible to clean the cloth secured to the drum properly between the individual filtration stages. The cloth is damaged upon making use of scrapers, and is no longer usable after a few filtering operations. Without scrapers, the separation of the filter cakes is incomplete or even impossible, the cakes remaining stuck to the filter cloth.

It is an object of the invention to provide a filtration device of the kind described in which these disadvantages are avoided or substantially eliminated.

Accordingly, the invention consists in a filtration device of the kind described, wherein a second continuous filter cloth also enflanks said first sector and extends away from the drum in said second angular sector, the outer surface of the drum comprising in alignment with each of said cells, a series of grooves in communication with an orifice for recovery of clear liquid.

Due to this arrangement, the two filter cloths may be cleaned appropriately at the outside of the second angular sector.

The injection of the charged liquid in a lateral direction renders it possible to avert the difficulties encountered in establishing sealing with radial injection tubes traversing the filter cloth.

The drum preferably comprises an external covering formed by a rubber mat wherein the grooves are formed.

The control means may comprise an inflatable sheath situated between the said cellular elements and a fixed external binding.

An uncomplicated structure of this kind proved to be very reliable during protracted operation of the filtration device.

In a preferred embodiment of the device, the said charged liquid injection means comprise—for each cellular element—at least one lateral injection tube connected to a source of charge liquid and which is displaceably arranged between an injection position in which its free extremity extends between the two cloths into the filtration chamber delimited between the drum and the corresponding cellular element, and an idle position in which it extends at the outside of this chamber and is clear of the filter cloths, control means being provided for taking each tube into its idle position when it reaches the level of the said second angular sector and for returning it to its injection position when it leaves this sector.

Due to this system, the injection tubes are automatically withdrawn from the filter cloths when these are separated from each other in the second angular sector for removal of the filter cakes. Sealing between the tube and the opening between the cloths at the level of each cellular element may easily be established due to the presence of an appropriate lining situated on the free extremity of the tube.

The said injection tubes are preferably joined to the drum.

In a modification, the tubes are installed on a movable bearer entrained synchronously with the drum.

In another embodiment, the means of controlling the tubes comprise a fixed cam situated at the level of the second angular sector and which co-operates with a guiding surface provided on each tube for moving the same into its idle position.

The control means for the injection tubes may comprise a double-acting ram for each tube, which is situated between the drum and the tube and the control circuit of which comprises an electrical contactor actuated by a fixed cam arranged at the level of the second angular sector.

To enable complete removal of the solid cakes, the device may comprise guiding means acting to move the two filter cloths away from each other, situated at the level of the second angular sector.

The construction according to the invention thus combines the advantages of a doubled filtering surface with those of a structure which is uncomplicated and operates well and reliably.

Furthermore, the device may if desired comprise means for connecting the discharge orifices of the grooves of the cellular elements to a source of compressed drying air and to a source of washing water, and for connecting the discharge orifices of the drum to a duct for discharge of the air or water thus injected.

It is possible to perform a washing and/or drying action on the cakes formed, thanks to this arrangement.

In another particularly advantageous embodiment of the device, the bottom of each cellular element is covered with a mat movable in a radial direction and in which the grooves are formed, the parts provided with grooves or flutes of the said drum mat also being movable in a radial direction and means being provided for directing a compacting fluid between the mats and the bottom of the cell and the drum, respectively.

Figure 2:
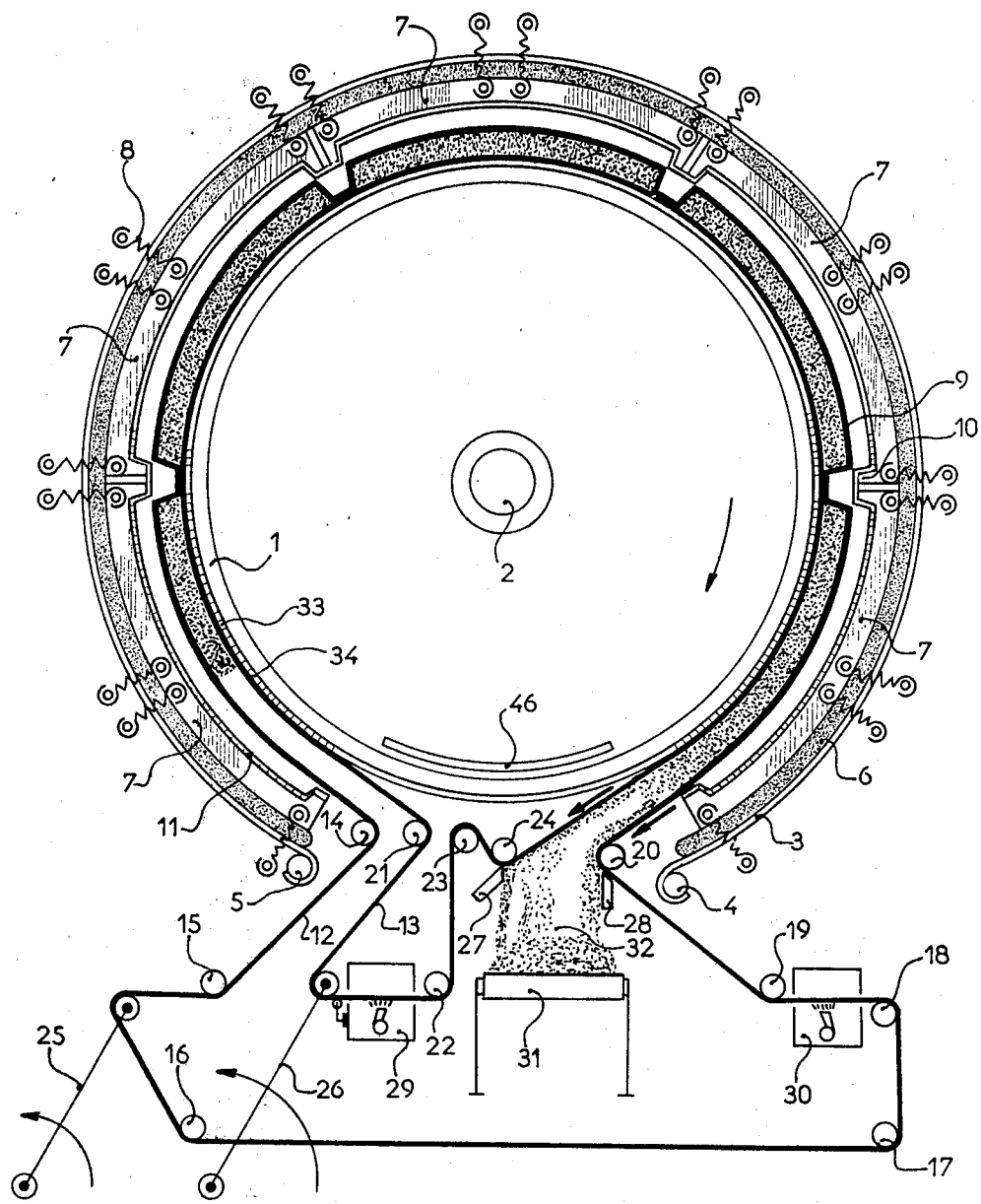
Figure 3:
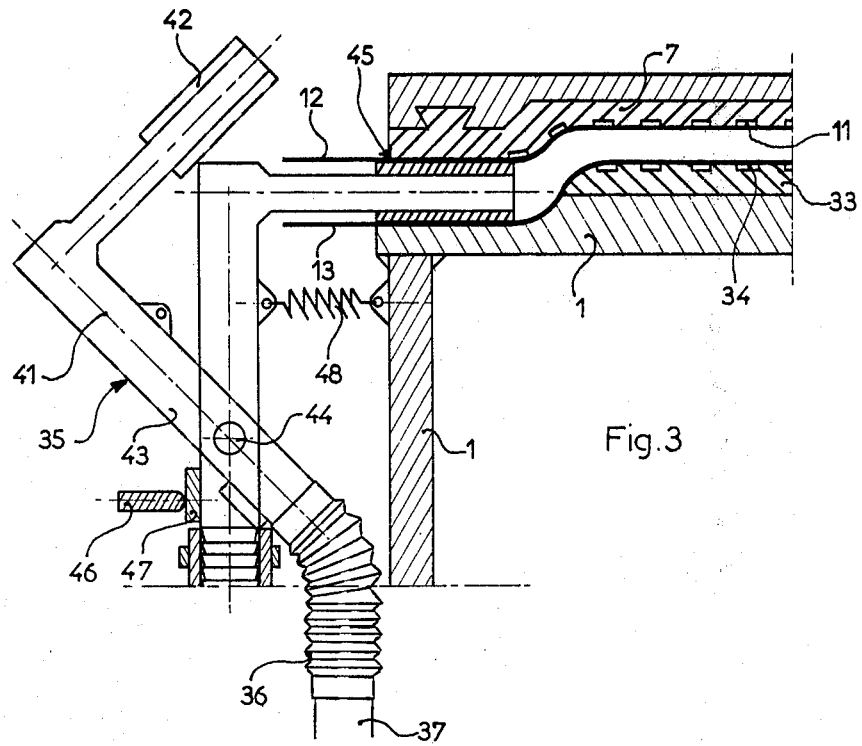
Figure 4:
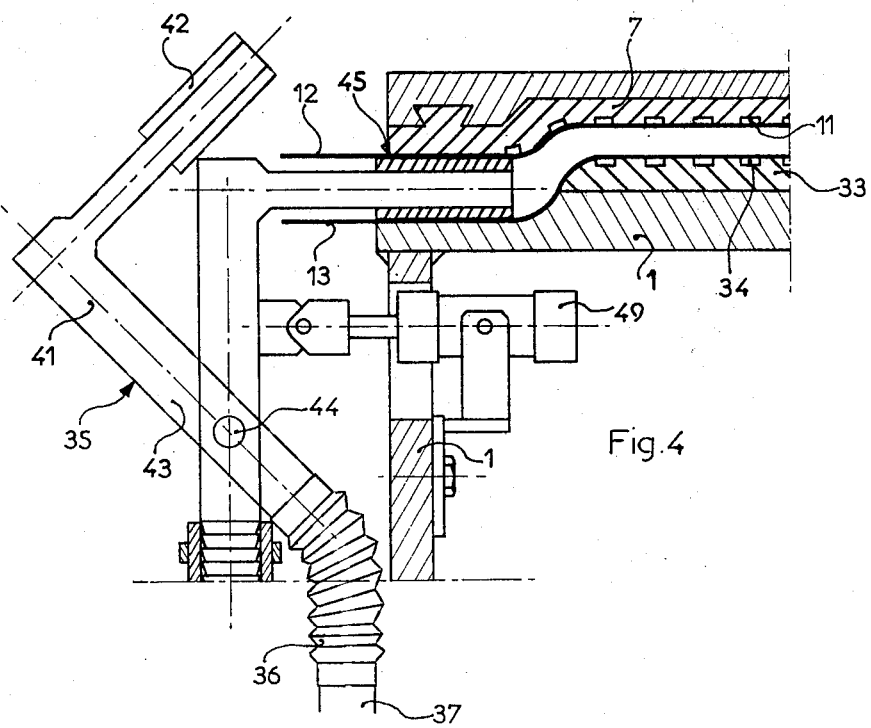
Figure 5:
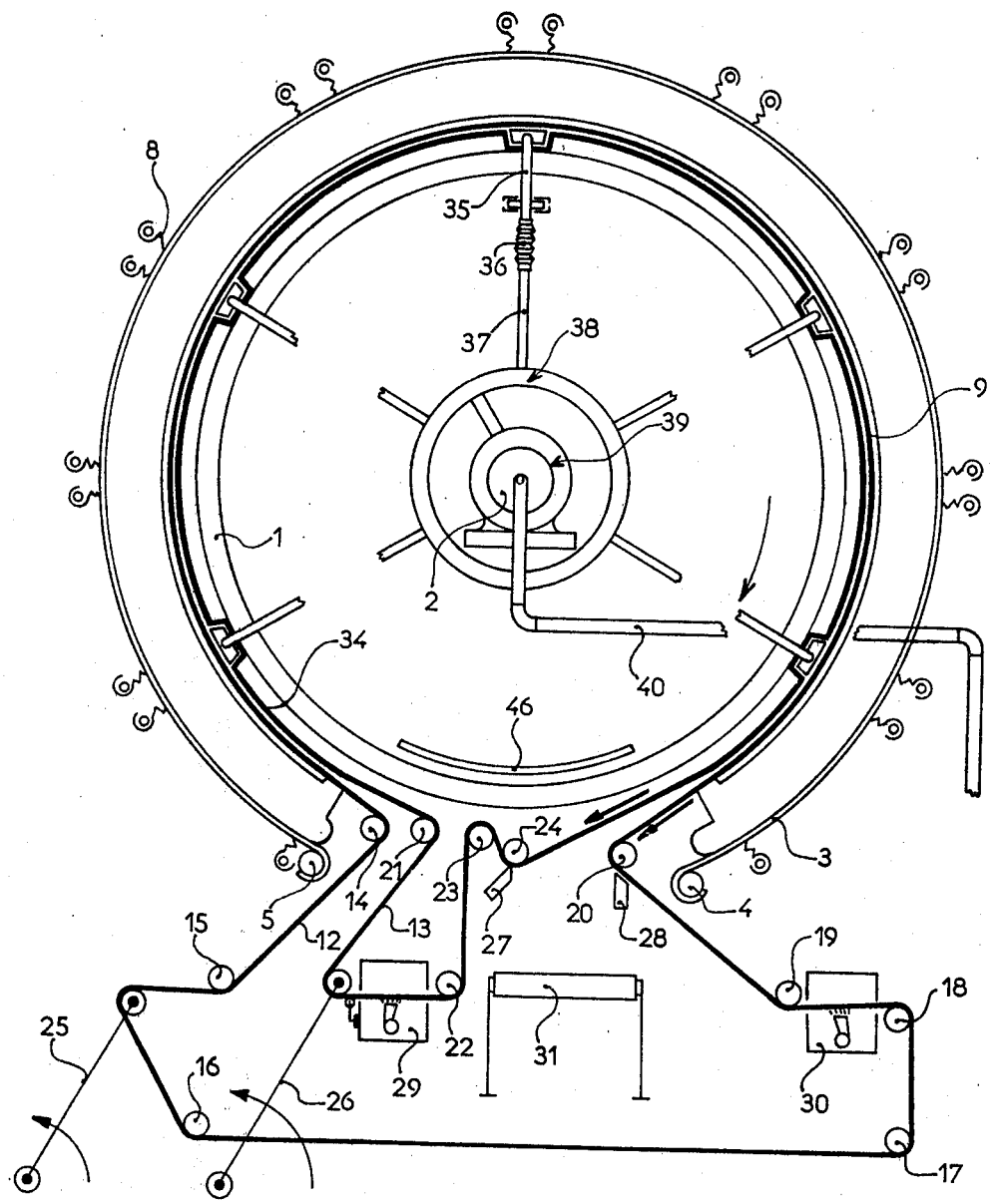

In order that the invention may be more clearly understood, reference will now be made to the accompanying drawings which, show some embodiments thereof by way of example and in which:

FIG. 1 is a view in vertical cross-section of a filter in accordance with the invention in its filtering position in which the drum and the filtering cloths are immobilised, FIG. 2 is a view in vertical cross-section of the filter illustrated in FIG. 1, in its own position in which the cake retained between the two filter cloths is extracted, FIGS. 3 and 4 are diagrammatical views in cross-section showing two embodiments of a tube for injection of the charge liquids into the filtration chambers of the filter, and FIG. 5 is a diagrammatical view in lateral elevation with some parts of the filter illustrated in FIGS. 1 and 2 being sectioned.

Referring now to the drawings, around a drum 1 as situated a binding 3 formed by a metal strap the ends of which are held by anchoring elements 4,5. The binding 3 extends over the greater part of the periphery of the drum but a lower portion of the drum 1 remains clear to allow of extraction of the filter cakes as described in particular below. Below the binding 3 is or are situated one or more inflatable sheaths 6 connected to a source of compressed air which is not illustrated herein. Below the sheath 6 is situated a series of filter elements 7 movable in a radial direction between two predetermined operating positions.

On its inward side, each filter element comprises a cell 9 girdled by a rim 10 in such manner that it delimits a filter chamber when it is applied via its rim 10 on the drum 1 under the action of the inflatable element 6. The bottom of the cell 9 is equipped with grooves 11 which are in communication with a lateral orifice (not illustrated) for discharge of the clear liquid. The grooves 11 are illustrated in FIGS. 1 and 2 for a single filter element 7 only.

Between the drum 1 and the filter elements 7 are situated two filter cloths 12,13 appearing in the form of a belt arranged in a closed loop. At the level of the uncovered lower angular portion of the drum 1, the filter cloths 12,13 leave the drum 1 and are guided over deflecting rollers 14,15,16,17,18,19,20 for the outer cloth 12, and 21,22,23,24, for the inner cloth 13. Along the external trajectories of the filter cloths 12,13 are situated scrapers 27,28 and washing stations 29,30 assuring complete cleansing of the cloths after every filtration stage. This cleansing of the cloths 12,13 is essential to the satisfactory operation of the filter.

Below the rollers 20 and 24 acting to separate the cloths 12 and 13 from each other, is situated a belt conveyor 31 for withdrawal of the filter cakes 32 as illustrated in FIG. 2.

The outer surface of the drum 1 is covered with a rubber mat 33 which in alignment with the grooves 9 of the filter elements 7 has grooves 34 in communication with a lateral orifice for the discharge of the clear liquids. In alignment with the rims 10 of the filter elements 7, the outer surface of the mat 33 is smooth to assure satisfactory sealing of each filter chamber delimited by these rims. In a modification, the grooves 34 may be formed direct in the external surface of the jacket of the drum 1, and it is no longer necessary in this case to provide the rubber mat 33.

The filter in accordance with the invention comprises at least one injection tube 35 which may be engaged between the two filter cloths 12,13 as illustrated in particular in FIGS. 3 and 4, for supply of the charged liquid for each filter chamber, that is to say for each filtering element 7. The tubes 35 are situated at one at least of the lateral extremities of the drum 1 and are each connected via a hose 36 and a duct 37 to a distribution and feed device 38 comprising a rotary joint 39 supplied with charged liquid via a pipe 40.

As will be apparent from FIGS. 3,4 each tube 35 is formed by an elbow tube 41 which at the extremity of its free branch has a sealing lining 42. The tube 41 is installed with its other branch 43 on a pivot 44 situated on the drum 1 of the filter. In its injection position illustrated by solid lines in FIGS. 3 and 4, the extremity of the free branch extends with its lining 42 through an opening 45 formed between the drum 1 and the filter elements 7, and thus between the cloths 12,13 into the filter chamber formed by a cell 9. The charged liquid may then be directed into this chamber via the tube 35.

The tube 35 should be withdrawn and separated from the cloths 12,13 during extraction of the cakes. To this end, the framework of the filter comprises—at the level of the lower uncovered portion of the drum 1—a cam 46 operating the outward pivoting of each tube 35 when the latter reaches the level of the uncovered portion of the drum. In the form of embodiment illustrated in FIG. 3, the cam 46 co-operates direct with a guiding surface 47 situated on the vertical branch 43 of the tube 35, and a return spring 48 tends to keep the same in its injection position. By contrast, according to the embodiment illustrated in FIG. 4, the cam 46 actuates an electrical contactor (not illustrated) inserted into the control circuit of a double-acting ram 49 situated between the drum 1 and the vertical branch 43 of the tube 35 and which may displace the same from its position of injection between the two cloths 12,13 into a disengaged position at the outside of the cloths.

In a particularly advantageous embodiment, the filter comprises three injection tubes for each filter chamber, ensuring rapid charging and a reduction of the unproductive period between filtering stages.

The filter in accordance with the invention operates in the following manner:

During the filtering stage, the drum 1 and the cloths 12,13 are immobilized. The sheath 6 is inflated and thus applies the filter elements 7 on the drum 1, and a series of sealed filter chambers is thus established. These tubes 35 are placed in their injection position within openings 45. The pump 39 is started and impels the charged liquid through the pipes 37,36 and the tubes 35 into each filter chamber. The clear liquid passes through the two filter cloths 12,13 and flows off through the grooves 11 of the elements 7 and the grooves 34 of the mat 33 or of the drum and is thus discharged via the lateral recovery orifices. During this operation, a cake of solid materials (FIG. 1) is formed in each chamber between the filter cloths 12,13.

When the density and proportion of humidity reach appropriate predetermined values, the sheath 6 is deflated and thus moves apart from the drum 1 and the solid cake formed between the filter cloths (FIG. 2). The means of entraining the drum 1 and the cloths 12,13 are then started up to cause these elements to advance in the direction of the arrows illustrated in FIG. 2. During this rotation of the drum, the guiding surface 47 (FIG. 3) or the contractor of the control circuit of the ram 49, encounter the cam 46 which thus operates the pivoting of the tubes 35. The tubes are withdrawn from the holes 45 when the cloths 12,13 are separated from each other thanks to the rollers 20 and 24 and the cakes 32 thereupon drop on the conveyor 31. The scrapers 27,28 cleanse the surface of the cloths which is in contact with the cakes and the washing devices 29,30 complete this operation.

After the extraction of the cakes from all the filter chambers, another filtering operation may be undertaken quickly thereafter.

To perform a drying operation of the cakes formed between the cloths 12,13, the device comprises means (not illustrated) for connecting the discharge orifices of the grooves 11 of the filter elements 7 to a source of compressed air which thus flows through the outer cloth 12, the cakes 32 and the inner cloth 13, and is recovered via the grooves 34 of the mat 33 of the drum 1 at the level of the discharge orifices thereof.

A washing liquid may be directed through the cakes formed, in the same manner.

In particular cases, if it is desired to perform a compacting action on the cakes formed prior to their extraction from the filtration device, the parts of the mat 33 situated in alignment with the cells 9 are movable in radial direction and the bottom of the cells 9 is covered by a mat (not illustrated) in which the grooves or flutes 11 are formed. This latter mat is also displaceable in radial direction. Furthermore, the device in this case comprises means (not illustrated) for directing a fluid under pressure between the drum 1 and the movable parts of the mat 34 and between the bottom of the cells 9 and their mat to cause displacement of the mat 34 in an outward radial direction and of the mats of the cells in an inward radial direction, in such manner as to compact the cakes 32 formed between the two cloths 12 and 13.

We claim:

1. A filtration device comprising, in combination, a rotary drum, a first continuous filter cloth enflanking a first angular sector of the drum and separable from the drum in a second angular sector, a second continuous filter cloth enflanking said first sector and separable from the drum in said second angular sector, a series of cellular elements enflanking the first sector and comprising a cell whose interior has grooves in communication with a discharge orifice for filtered liquid from said first cloth, lateral injection means for injecting a charged liquid to be filtered and comprising, for each cellular element, at least one lateral injection tube connected to a source of charged liquid, means for moving said injection means between an injection position in which its free extremity extends between the two cloths into the filter chamber delimited between the drum and the corresponding cellular element, and an idle position in which the injection means extends at the outside of the chamber and is disengaged from the two filter cloths, control means for moving each injection means to said idle position when it reaches the said second angular sector and for returning the same to its injection position when it leaves said second sector, said drum having an outer surface comprising, in alignment with each of said cells, a series of grooves in communication with an orifice for recovery of filtered liquid from said second cloth, and control means for moving said cellular elements toward and away from said drum.

2. A filtration device as claimed in claim 1, wherein said injection means comprises injection tubes connected to said drum.

3. A filtration device as claimed in claim 1, wherein said injection means comprises injection tubes are provided on a movable support driven synchronously with said drum.

4. A filtration device as claimed in claim 1, wherein at its free extremity intended to be engaged between the filter cloths, each tube carries a sealing covering.

5. A filtration device as claimed in claim 1, wherein said control means of the tubes comprises a fixed cam situated at the level of said second angular sector and which cooperates with a guiding surface situated on each tube to move the same into its idle position.

6. A filtration device as claimed in claim 1, wherein said control means of the injection tubes comprises, for each tube, a double-acting ram located between the drum and the tube and the control circuit of which comprises an electrical contactor actuated by a fixed cam situated at the level of the second angular sector.

7. A filtration device as claimed in claim 1, wherein said control means for moving said cellular elements toward and away from said drain comprises, an inflatable sheath situated between said cellular elements.

* * * * *